United States Patent [19]
Shimajiri et al.

[11] 4,172,683
[45] Oct. 30, 1979

[54] MACHINE TOOL HAVING DRAWBAR MECHANISM

[75] Inventors: Tokiji Shimajiri, Kawasaki; Hideo Katsube, Hachioji; Mitsuo Saito, Tokyo; Koichi Matsuura, Hino, all of Japan

[73] Assignee: Fujitsu Fanuc Limited, Tokyo, Japan

[21] Appl. No.: 851,767

[22] Filed: Nov. 15, 1977

[30] Foreign Application Priority Data

Nov. 27, 1976 [JP] Japan .............................. 51-142526

[51] Int. Cl.² .......................................... B23B 39/20
[52] U.S. Cl. .................................... 408/239 A; 408/35
[58] Field of Search ................ 408/239 R, 239 A, 35; 90/11 D

[56] References Cited

U.S. PATENT DOCUMENTS

| | | | |
|---|---|---|---|
| 3,473,419 | 10/1969 | Ollearo | 408/35 |
| 3,730,637 | 5/1973 | Cellini | 408/239 |
| 3,868,886 | 3/1975 | Bondie | 90/11 D |

FOREIGN PATENT DOCUMENTS 379329  7/1973  U.S.S.R. .............................. 90/11 D

*Primary Examiner*—Gil Weidenfeld
*Attorney, Agent, or Firm*—Staas & Halsey

[57] ABSTRACT

There is disclosed a machine tool, of the type having a tool magazine for receiving tools therein, and wherein a spindle head is moved in the direction of the axis of a spindle relative to the tool magazine such that one of the tools in the tool magazine is engaged with or disengaged from the spindle. A draw bar for firmly attaching a tool to the spindle is positioned inside of the spindle. The operation of the draw bar is actuated by the movement of the spindle head relative to the tool magazine.

5 Claims, 7 Drawing Figures

U.S. Patent  Oct. 30, 1979  4,172,683
Fig. 1
Fig. 2
Fig. 3
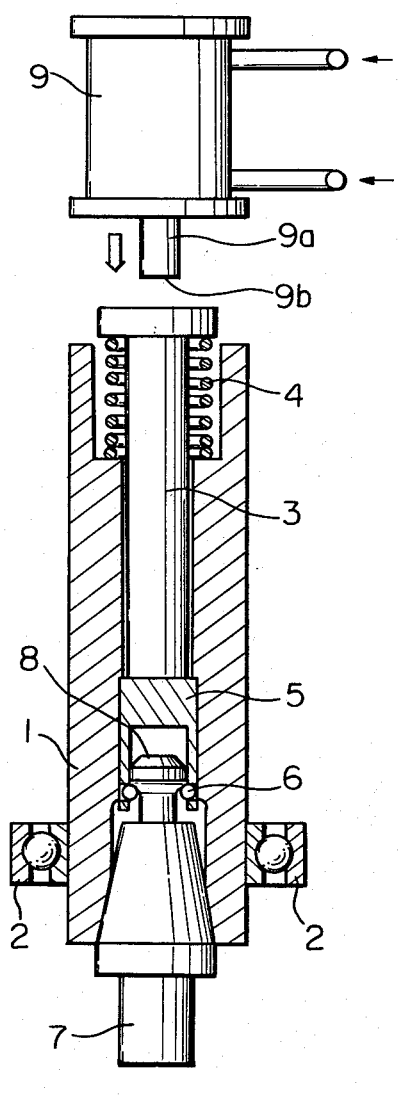
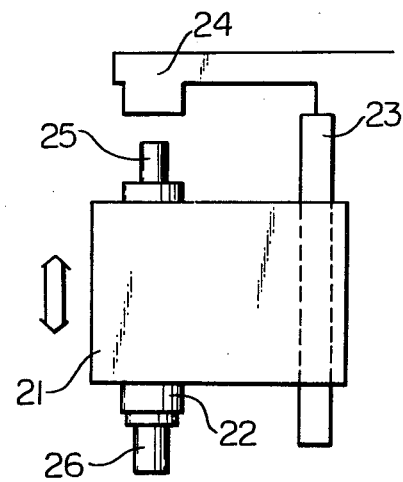
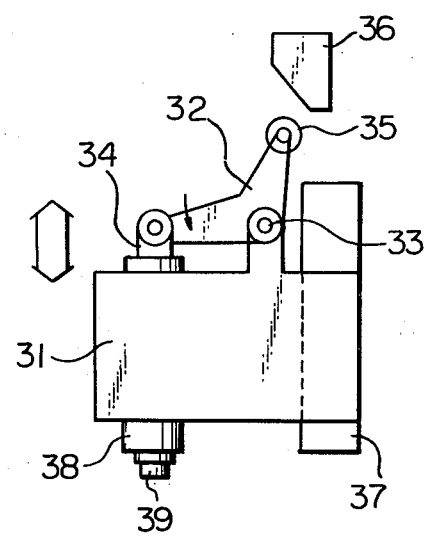
PRIOR ART

MACHINE TOOL HAVING DRAWBAR MECHANISM

FIELD OF THE INVENTION

The present invention relates generally to machine tools and, more particularly, relates to an improved spindle structure adapted to be mounted on a machine tool of the type having a tool magazine for storing diverse tools therein.

BACKGROUND OF THE INVENTION

Machine tools of the type having a tool storage magazine are conventionally used in the field of metal machining. In machine tools of this type, engagement of a tool to be used in a machining process with the spindle structure mounted on the machine tool is performed prior to the start of the machining process, while disengagement of the tool from the spindle structure is performed as soon as the machining process is completed.

In typical machine tools of the type described above, a tool engaging process is adopted in which, when one of the tools in the tool magazine must be engaged with the spindle of the spindle structure, the axis of the tool is first brought into axial alignment with the axis of the spindle of the spindle structure. Thereafter, an axial movement between the spindle head of the spindle structure and the tool magazine is made until the tool approaches the spindle and is eventually engaged with the spindle. Further, when it is required to return the tool from the spindle to the tool magazine after completion of the machining process, a tool disengaging process for disengaging the tool from the spindle of the spindle structure is employed.

In the above-described conventional machine tools, transmission of a rotating drive force from the spindle to a tool engaged with the spindle is effected by adopting a mechanical structure in which a tapered portion in a tool arbor and a corresponding tapered bore formed in the tool receiving portion of the spindle are tightly fitted to one another. The adoption of the above-described mechanical structure is effective only in the case where the tool received by the spindle is used for effecting a simple drilling process of a metal workpiece. However, in the case where the above-described mechanical structure is adopted for a tool which is used for effecting a milling process of a workpiece, the tool is loosened from the spindle due to a force acting on the tool in the direction perpendicular to the axis of the tool during the milling process. Consequently, the accuracy of the milling process is decreased, and this lower accuracy is unfavorable from the point of view of mechanical performance of a machine tool.

In order to prevent a decrease in the accuracy of the milling process, some conventional machine tools employ a spindle structure in which a draw-bar is provided inside the spindle to enable the spindle to firmly hold a tool. However, in the spindle structure of a machine tool having a draw-bar, a particular draw-bar actuator, such as an air cylinder or a hydraulic cylinder, must be arranged to actuate the draw-bar so as to loosen a tool from the spindle when the tool is to be transferred from the spindle to the tool magazine. Since an actuator, such as air cylinder or hydraulic cylinder, is expensive its use results in the production cost of the entire machine tool being too high.

SUMMARY OF THE INVENTION

An object of the present invention is to provide an improved spindle structure adapted to be mounted on a machine tool of the type having a tool magazine, and whereby the transfer of a tool from the tool magazine to the spindle, or from the spindle to the tool magazine, is easily performed without sacrificing the firm holding of the tool by the spindle.

Another object of the present invention is to provide a simple and low production cost mechanism for actuating a draw-bar provided in the spindle structure adapted to be mounted on a machine tool of the type having a tool magazine, and whereby the production cost of the machine tool is reduced.

The above objects and advantages of the present invention will readily be understood from the description of the embodiments set forth below with reference to the accompanying drawings, wherein:

FIG. 1 is a schematic view, partly in cross-section of a conventional spindle structure for a conventional machine tool of the type having a tool magazine;

FIG. 2 is a schematic side elevation view showing a spindle structure adapted for a machine tool of the type having a tool magazine, according to an embodiment of the present invention;

FIG. 3 is a schematic side elevation view showing a spindle structure according to another embodiment of the present invention;

Figure 4:
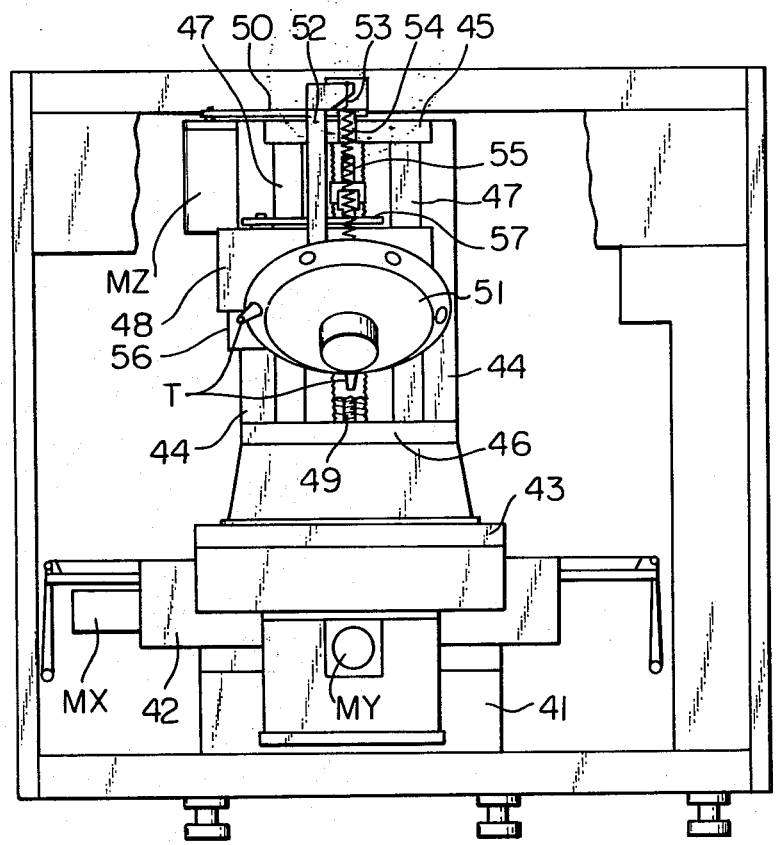
FIG. 4 is a front elevation view of a machine tool of the type having a tool magazine, and which is provided with a spindle structure of the present invention.

Before describing the present invention, a brief description of a conventional spindle structure will be provided with reference to FIG. 1.

Referring to FIG. 1, a spindle 1 of a conventional spindle structure is rotatably held by a spindle head (not shown), which is arranged to be unable to move in the axial direction, via a bearing 2. Inside the spindle 1 is a draw-bar 3 which is slidably mounted for axial movement in the spindle 1. The draw-bar 3 is also arranged to be subjected to upward pressure exerted by a spring 4 seated against an inner abutment of the spindle 1. The draw-bar 3 is formed with, at its lower end, a tool engaging portion 5 having therein a plurality of steel balls 6.

A tool 7, which was transferred from a tool magazine (not shown) and which is positioned in the spindle 1, is provided with a pull stud 8 integrally formed at one end of the tool 7. The pull stud 8 is shaped so as to be engageable with the tool engaging portion 5 of the draw-bar 3. Above the uppermost end of the draw-bar 3, a hydraulic cylinder 9 is arranged. The hydraulic cylinder 9 has an actuating rod 9a, the lowermost end 9b of which is positioned adjacent to the uppermost end of the draw-bar 3. When the tool 7 is inserted into the spindle 1, and the pull stud 8 is engaged with the engaging portion 5 of the draw-bar 3, the tapered portion of the tool 7 is pressed against the tapered bore of the tool holding portion of the spindle 1 due to the spring force exerted by the spring 4. Thus, the tool 7 is brought into a position where it is rotatable with the spindle 1. On the other hand, when it is necessary for the tool 7 to be disengaged from the spindle 1, a pressurized oil is supplied into the hydraulic cylinder 9. As a result, the actuating rod 9a is moved downwardly so as to apply a downward pressure to the uppermost end of the draw-bar 3. Thus, the draw-bar 3 is moved in an axially downward direction against the force of the spring 4. In response to the downward movement of the draw-bar 3, the steel balls 6 move in a radially outward direction. Thus, the pull stud 8 of the tool 7 is disengaged from the engaging portion 5 of the spindle 1.

As will be understood from the foregoing description, in conventional spindle structures adapted for mounting on machine tools of the type having tool magazines, high production cost actuators, such as hydraulic cylinders, are adopted for actuating a draw-bar of the spindle structure. Further, the use of a hydraulic cylinder requires a pipe line for distributing pressurized oil. For these reasons, conventional spindle structures result in raising the cost of the entire assembly of a machine tool of the type having a tool magazine.

The spindle structure of the present invention, described hereinafter, eliminates the above-mentioned defects.

Referring now to FIG. 2 showing an embodiment of a spindle structure of the present invention, a spindle head 21 supports therein a rotatable spindle 22, and is arranged to be movable in the directions shown by the arrow by means of a guide 23 upon being driven by a drive source (not shown). Above the spindle head 21 is a rigid stop 24 which is located at a position confronting an uppermost end of a draw-bar 25 provided in the inside of the spindle 22. Therefore, if the spindle head 21 is upwardly moved along the guide 23, the draw-bar 25 is also moved, and the uppermost end of the draw-bar 25 abuts against the stop 24. Subsequently, if the spindle head 21 is moved further upwardly, the draw-bar 25 begins to move downwardly against a spring (not shown) similar to the spring 4 shown in FIG. 1. As a result, an engagement between the draw-bar 25 and the pull stud of a tool 26 is released by the same principle as in the case of the tool 7 of FIG. 1.

FIG. 3 shows another embodiment of the present invention. In the embodiment of FIG. 3, a bell crank lever member 32 is pivoted at a point 33 on a spindle head 31. The lever member 32 has two ends, one being pivotally connected to the upper end of a draw-bar 34 and the other being provided with a roller 35. Reference numeral 36 designates a cam located at a fixed position above the roller 35 of the lever member 32. The cam 36 has an inclined cam surface against which the roller 35 abuts when the spindle head 31 is moved upwardly along a guide 37. When the roller 35 of the lever member 32 abuts against the cam surface of the cam 36 and the spindle head 31 is moved further upwardly, the lever member 32 begins to pivot about the point 33, in the direction shown by the arrow, in response to movement of the roller 35 along the inclined surface of the cam 36. The pivoting motion of the lever member 32 causes a downward movement of the draw-bar 34. As a result, in the tool engaging portion of the lower end of the draw-bar 34, steel balls, similar to the balls 6 as shown in FIG. 1, move radially outwardly so that an engagement between the pull stud of a tool 39 and the tool engaging portion of the draw-bar 34 is released. Consequently, the tool 39 may be disengaged from the spindle 38.

As will be understood from the foregoing description of the two embodiments, the spindle structure of the present invention does not employ high production cost device as in the case of the conventional spindle structure of FIG. 1.

FIG. 4 is a front elevation view of a machine tool of the type having a tool magazine, and which is provided with a spindle structure according to the present invention. In FIG. 4, numeral 41 designates a machine bed on which a saddle 42 is mounted for reciprocating movement in one predetermined plane (Y-axis plane) by a drive motor MY. On the saddle 42, a table 43 is mounted so as to be reciprocally moved in a predetermined plane (X-axis plane) perpendicular to the Y-axis plane, by a drive motor MX. Columns 44 are formed integrally with the machine bed 41. Frames 45 and 46 are attached to the columns 44. Between the frames 45 and 46, there is provided a pair of vertical guide bars 47 which are parallel to one another. A spindle head 48 is reciprocally mounted to move vertically along the guide bars 47. Vertical movement of the spindle head 48 is accomplished by a feed screw 49 which is rotated, via a drive belt 50, by a feed motor MZ fixed onto the left column 44 of FIG. 4. Mounted on the spindle head 48 is a tool magazine 51 in which a plurality of tools T are mounted in such an arrangement that each tool is spaced from an adjacent tool by an equiangular distance along the circumference of the tool magazine 51. An arm member 52 is attached, at its lowermost end, to the spindle head 48. A coil spring 53 is disposed between the tool magazine 51 and the upper end of the arm member 52, so that the tool magazine 51 is always upwardly retracted by the coil spring 53. A cam 54 is rigidly connected to the frame 45. A lever 55 is mounted on the spindle head 48. A spindle drive motor 56 is disposed so as to rotate a spindle (not shown in FIG. 4) via a drive belt 57. As shown in FIG. 5A, a cam 54 is connected to the frame 45 by means of screws 81. Onto the upper surface of the spindle head 48, a base 80 is fixed by means of screws 58. The lever 55 is connected to the base 80 by means of a pivot pin 59, so that the lever 55 is able to pivot about the pivot pin 59. The lever 55 is provided with, at one end thereof, a roller follower 60 which is rotatable about a pin 61. The other end of the lever 55 is attached to a housing 63 which is able to push a draw-bar 62 in the downward direction. That is to say, the other end of the lever 55 is formed with a forked end 82 (FIG. 5B) having pins 64 engaged in notches 65 of the housing 63.

The spindle head 48 is provided with a nut member 66 which is engaged with the feed screw 49. Therefore, when the feed screw 49 is rotated by the feed motor MZ (Fig. 4) via drive belt 50, the spindle head 48 is vertically moved through the engagement of the feed screw 49 and the nut member 66. That is to say, the feed motor MZ can control the reciprocal vertical movement of the spindle head 48.

Figure 5:
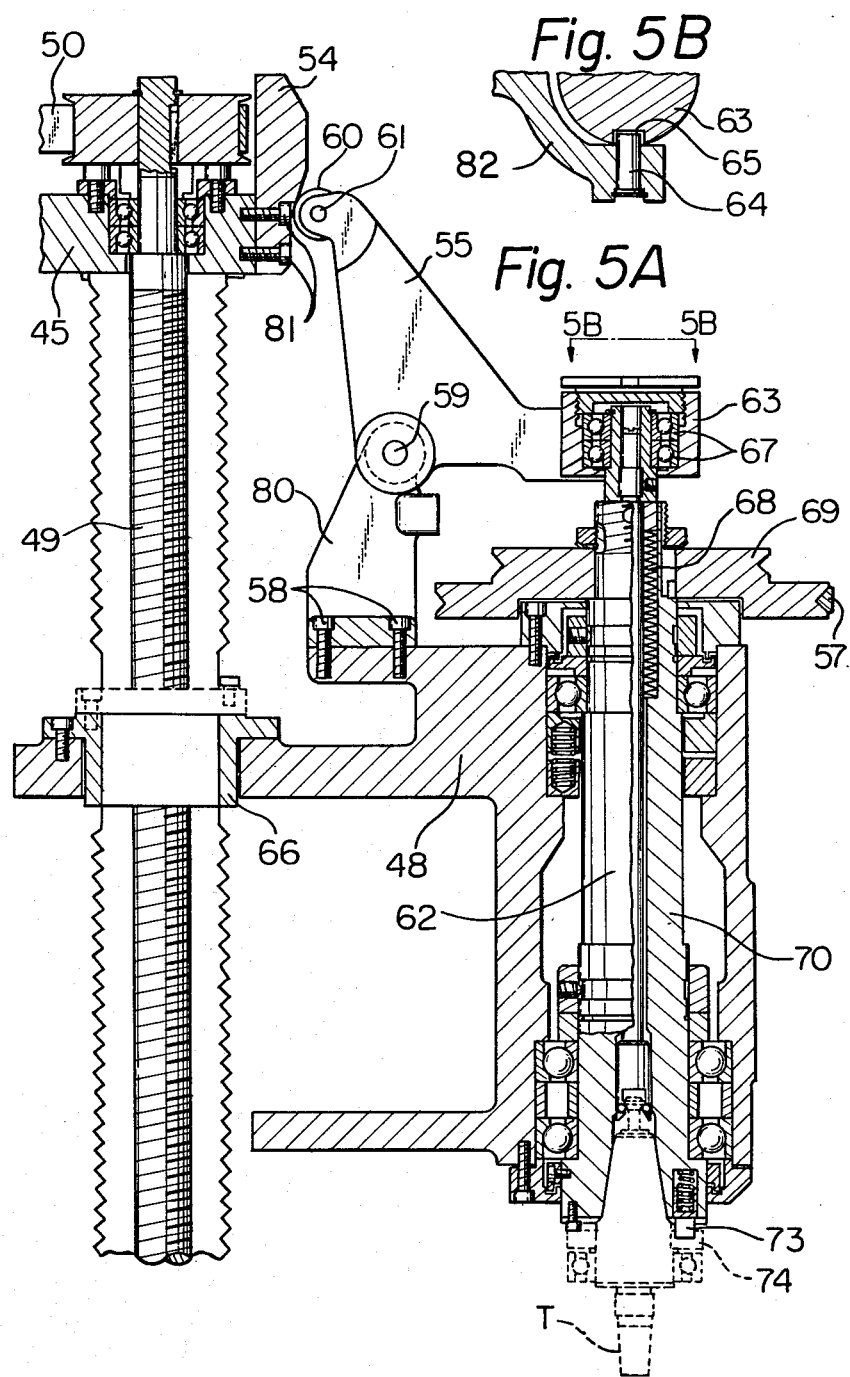
FIG. 5A is an enlarged cross-sectional view showing the spindle structure of the machine tool of FIG. 4.
FIG. 5B is a top plan view of a part of the spindle structure shown in FIG. 5A.

If the spindle head 48 is moved upwardly beyond the position indicated in FIG. 5, the lever 55 pivotally mounted on the spindle head 48 is caused to rotate in the clockwise direction about the pin 59, because the roller follower 60 of the lever 55 moves along the inclined cam surface of the cam 54. As a result, the pins 64 push the housing 63 downwardly. Consequently, the draw-bar 62 is downwardly moved against the spring force of a spring 68 and releases the engagement of the draw-bar 62 and the tool T.

In FIG. 5, reference numeral 69 designates a pulley connected to a spindle 70. The pulley 69 is driven by the spindle motor 56 (FIG. 4) via the drive belt 57.

Figure 6:
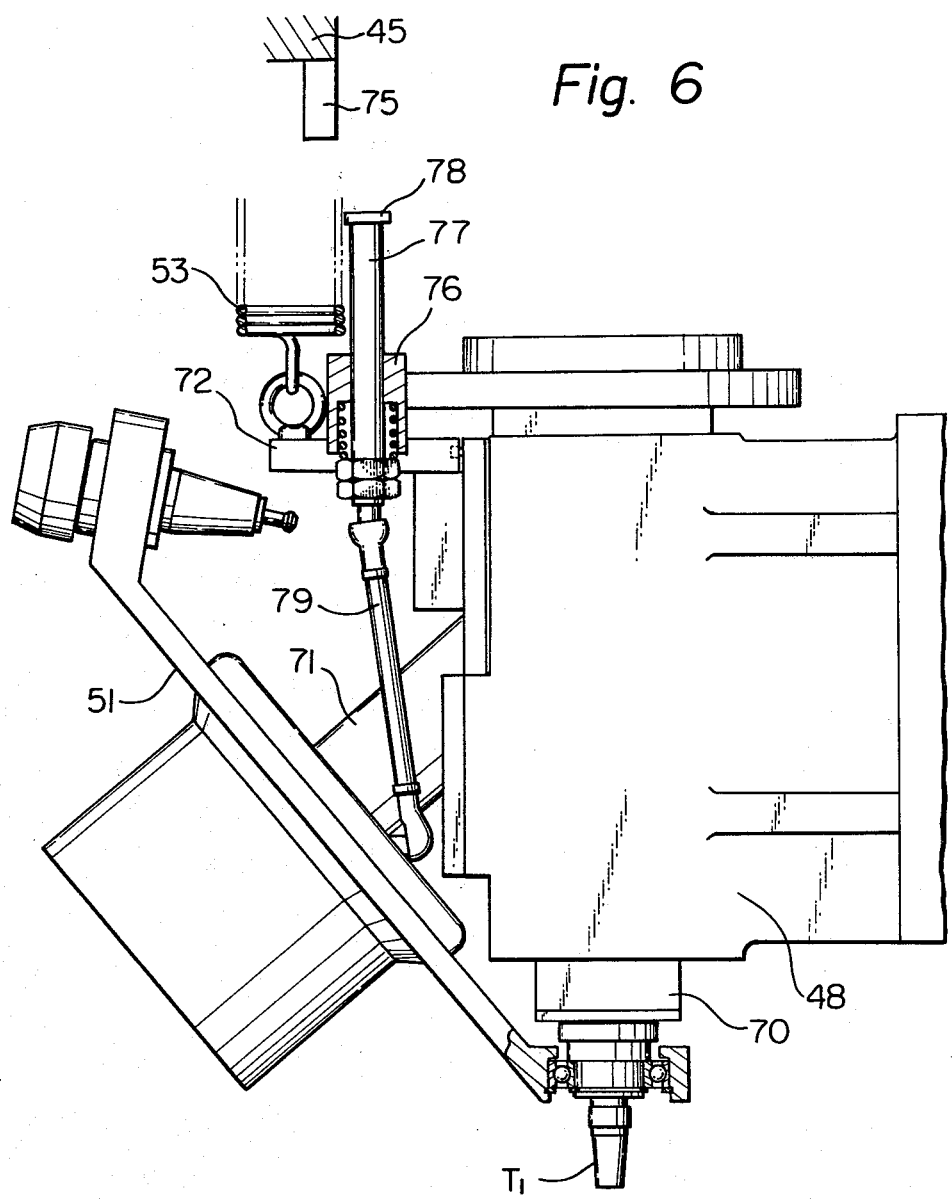
FIG. 6 is a side elevation view, partially in cross-section, of the tool magazine and the related parts of the spindle structure of FIG. 5A.

Referring now to FIG. 6, a tool magazine 51 of a machine tool is arranged adjacent to the spindle structure of the present invention. A support shaft 71 of the tool magazine 51 is firmly secured to a plate 72 which is upwardly pulled by a coil spring 53. Therefore, the tool magazine 51 together with a tool designated by $T_1$ in FIG. 6 also undergo the pulling action exerted by the coil spring 53. As a result, the tool $T_1$ is engaged with the spindle 70 due to the spring force of the spring 53. At this stage, the pull stud of the tool $T_1$ is upwardly pulled by the draw-bar 62 (FIG. 5A), under the effect of the spring force exerted by the spring 68 shown in FIG. 5A. Thus, the tapered portion of the tool arbor of the tool $T_1$ is tightly fitted into the tapered bore of the spindle 70, as shown in FIG. 5A. Further, as shown in FIG. 5A, a key 73 provided for the spindle 70 is engaged into a notch formed in a flange 74 of the tool arbor of the tool $T_1$. Therefore, the rotation of the spindle drive motor 56 (FIG. 4) is transmitted to the tool $T_1$ via the spindle 70. Consequently, if the motors MX, MY and MZ are controlled by a numerical controller (not shown), the tool $T_1$ operates so as to effect a drilling process or contouring process for a workpiece mounted on the table 43 shown in FIG. 4.

The tool changing operation will now be described with reference to FIGS. 4 through 6.

When a tool mounted in the spindle 70 should be changed to any one of the tools stored in the tool magazine 51, the spindle head 48 is moved upwardly by the operation of the motor MZ (FIG. 4). Thus, the spindle head 48 together with the tool magazine 51, support shaft 71 and plate 72 are moved upwardly until the plate 72 abuts a stop 75 fixed to the frame 45. Thereafter, only the spindle head 48 is continuously moved in the upward direction by the operation of the motor MZ. However, before an arm 76 firmly attached to the spindle head 48 abuts against a stop 78 of a bar 77, the roller follower 60 (FIG. 5A) rides onto a vertical surface of the cam 54 (FIG. 5A) so that releasing of the engagement between the tool and the draw-bar 62 (FIG. 5A) is completed. After the arm 76 abuts the stop 78, continuous upward movement of the spindle head 48 causes the upward movement of the bar 77 and the rod 79 through the abutment of the arm 76 and the stop 78 of the bar 77. The upward movement of the rod 79 causes the rotation of the tool magazine 51 by an angular amount so that a next tool in the tool magazine 51 is positioned underneath the spindle 70. Thereafter, by reversing the rotating direction of the motor MZ, the spindle head 48 can be moved downwardly until the next tool is firmly engaged into the spindle 70. When the next tool is firmly engaged into the spindle 70, the tool changing operation is completed, and the machining process by the next tool is started.

What is claimed is:

1. In a machine tool of the type having a magazine for receiving tools therein, a frame, a work table for mounting thereon a workpiece, a spindle head having an axially extending spindle formed at one end thereof, a tool receiving portion and a draw-bar movable inside of said spindle, and means for causing relative axial movement between said spindle head and said tool magazine, the improvement comprising:
    a first draw-bar actuating member fixed to said frame, wherein said first draw-bar actuating member comprises a cam;
    a second draw-bar actuating member mounted on said spindle head, wherein said second draw-bar actuating member comprises a pivotal lever member; and
    means whereby said first draw-bar actuating member presses said second draw-bar actuating member during the relative axial movement between said spindle head and said tool magazine such that said second draw-bar actuating member moves said draw-bar until a tool is disengaged from said tool receiving portion of said spindle.

2. A machine tool according to claim 1, wherein said pivotal lever member is shaped as a bell crank lever having one end cooperable with a surface of said cam and the other end disposed adjacent said draw-bar.

3. A machine tool according to claim 2, wherein said one end of said bell crank lever is provided with a roller follower rotatable on said cam of said first draw-bar actuating member.

4. A spindle structure adapted to be mounted on a machine tool of the type having a tool magazine for storing tools therein, comprising:
    a spindle head having a screw threaded portion, a feed screw rotatably mounted on said machine tool and engageable with said screw threaded portion of said spindle head, said spindle head being movable in a direction parallel to the axis of said feed screw in response to rotation of said feed screw;
    a spindle rotatably mounted on said spindle head, said spindle having one end for receiving one of the tools stored in said tool magazine;
    a draw-bar positioned inside said spindle and axially movable between a tool engaging position and a tool disengaging position, said draw-bar having one end engageable with a tool received in said one end of said spindle when said draw-bar is positioned at said tool engaging position, and the other end axially extending beyond said spindle;
    means for continuously applying to said draw-bar an elastic pressure which urges said draw-bar toward said tool engaging position;
    a first draw-bar actuating member fixedly mounted on a portion of said machine tool said first member having an actuating surface, and
    a second draw-bar actuating member pivotally mounted on said spindle head, said second member having one end which when engaged by said actuating surface of said first member causes said second member to pivot in response to movement of said spindle head and another end disposed adjacent said other end of said draw-bar such that said other end of said second actuating member moves said draw-bar toward said tool disengaging position in response to said pivoting motion of said second member.

5. A spindle structure according to claim 4, wherein said first draw-bar actuating member is a cam member and wherein said second draw-bar actuating member is a bell and crank lever member.

* * * * *